(12) United States Patent
Kim et al.

(10) Patent No.: US 10,657,546 B2
(45) Date of Patent: May 19, 2020

(54) OMNI-CHANNEL MARKETING CURATION SYSTEM BASED ON BIG DATA

(71) Applicant: Yeon Tae Kim, Yongin-si (KR)

(72) Inventors: Yeon Tae Kim, Yongin-si (KR); Joon Hee Lee, Seoul (KR)

(73) Assignee: Yeon Tae Kim, Yongin-si, Gyeonggi-Do (KR)

( * ) Notice: Subject to any disclaimer, the term of this patent is extended or adjusted under 35 U.S.C. 154(b) by 681 days.

(21) Appl. No.: 15/295,339

(22) Filed: Oct. 17, 2016

(65) Prior Publication Data
US 2017/0109762 A1 Apr. 20, 2017

(30) Foreign Application Priority Data

Oct. 19, 2015 (KR) .................... 10-2015-0145217

(51) Int. Cl.
*G06Q 30/00* (2012.01)
*G06F 40/00* (2020.01)
(Continued)

(52) U.S. Cl.
CPC ........ *G06Q 30/0201* (2013.01); *G06F 40/284* (2020.01); *G06T 11/001* (2013.01); *G06T 13/80* (2013.01)

(58) Field of Classification Search
CPC ..... G06Q 10/00–50/00; G06Q 30/0201; G06F 40/284; G06T 11/001; G06T 13/80
(Continued)

(56) References Cited

U.S. PATENT DOCUMENTS

| 2008/0172261 A1* | 7/2008 | Albertson .......... G06K 9/00335 |
| | | 382/103 |
| 2009/0030780 A1* | 1/2009 | York ...................... G06Q 30/02 |
| | | 705/14.41 |

(Continued)

FOREIGN PATENT DOCUMENTS

| JP | 5442401 B2 | 3/2014 |
| KR | 10-2006-0053214 A | 5/2006 |

(Continued)

*Primary Examiner* — Eric W Stamber
*Assistant Examiner* — Mustafa Iqbal
(74) *Attorney, Agent, or Firm* — Novick, Kim & Lee, PLLC; Jae Youn Kim (57) ABSTRACT

Provided is an omni-channel marketing curation system based on big data including a data collecting unit configured to collect behavior log data of a customer in an online store and behavior log data of the customer who visits an offline store; a big data storing unit configured to process, in real time, the log data collected in the data collecting unit; a log verbalization converting unit configured to analyze the customer's online/offline behavior log data, convert the analyzed result into one of a plurality of pre-defined verbal expressions, which indicate degrees of customer's reactions to a product, to store the converted result in the big data storing unit; a first attribute setting unit configured to receive customer's attribute information from a system user so as to create a profile for a persona according to the attribute; a persona generating unit configured to group, into one persona, customers corresponding to the attribute information received by the first attribute setting unit, generate one or more pieces of visualization information in correspondence to verbal expressions, and generate trajectory information through which how the visualization information moves to purchase the product; and a data visualization providing unit configured to consecutively play visualization information and trajectory information.

10 Claims, 10 Drawing Sheets

(51) Int. Cl.
*G06T 11/00* (2006.01)
*G06T 13/00* (2011.01)
*G06Q 30/02* (2012.01)
*G06F 40/284* (2020.01)
*G06T 13/80* (2011.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 2009/0083122 | A1* | 3/2009 | Angell | G06Q 10/0631 |
| | | | | 705/7.33 |
| 2009/0254531 | A1* | 10/2009 | Walker | G06Q 30/02 |
| 2011/0200226 | A1* | 8/2011 | Takahata | G06K 9/00295 |
| | | | | 382/103 |
| 2012/0290508 | A1* | 11/2012 | Bist | G06N 5/04 |
| | | | | 706/10 |
| 2015/0058077 | A1* | 2/2015 | Buban | G06O 30/0202 |
| | | | | 705/7.31 |
| 2015/0120697 | A1* | 4/2015 | Asner | G06F 16/2282 |
| | | | | 707/714 |
| 2015/0154709 | A1* | 6/2015 | Cook | G06Q 40/08 |
| | | | | 705/4 |
| 2015/0187102 | A1* | 7/2015 | Park | G09G 5/02 |
| | | | | 345/589 |
| 2015/0310447 | A1* | 10/2015 | Shaw | G06Q 30/016 |
| | | | | 705/304 |
| 2016/0179087 | A1* | 6/2016 | Lee | G01C 21/3664 |
| | | | | 700/9 |

FOREIGN PATENT DOCUMENTS

| | | |
|---|---|---|
| KR | 10-1058663 B1 | 8/2011 |
| KR | 10-1422128 B1 | 7/2014 |
| KR | 10-1462608 B1 | 11/2014 |
| KR | 10-2015-0039657 A | 4/2015 |
| KR | 10-2015-0090376 A | 8/2015 |

* cited by examiner

OMNI-CHANNEL MARKETING CURATION SYSTEM BASED ON BIG DATA

CROSS-REFERENCE TO RELATED APPLICATIONS

The present application claims priority under 35 U.S.C. 119 and 35 U.S.C. 365 to Korean Patent Application No. 10-2015-0145217 (filed on Oct. 19, 2015), which is hereby incorporated by reference in its entirety.

BACKGROUND

The present disclosure relates to an omni-channel marketing curation system based on big data, and more particularly, to an omni-channel marketing curation system based on big data capable of closely viewing a sales status for each store of a company in real time through animation and accurately measuring a marketing effect for each customer group by organically combining to manage online and offline stores in an omni point of view.

Global distribution companies are strengthening their competitive power while concentrating on provision of a differentiated service experience as well as just sales of products. Marketers in the companies consider very importantly whether their marketing strategies are efficient and how customers react to products released according to their marketing strategies, and want to accurately predict marketing effects.

According to a typical method, in order to know customers' reactions to products sold in an online store or offline stores, after sales data for each store is collected and the collected sales data is reflected in a statistical system, an analysis program is executed. Alternatively, a process is required to be undergone in which a developer changes and corrects a source code of an analysis program appropriately, and executes the analysis program. According to such a method, a lot of time is taken for data collection and it is difficult to compile statistics for live field sales data due to the time taken to collect the data. In addition, after application to a system, it is difficult to check a graph presented through the analysis program.

In addition, even though a customer purchased a corresponding product through advertisement or sales promotion, it may not be known whether the customer will visit again a corresponding store and there is not a method for predicting a future behavior of the customer since the effortful marketing becomes finished as a one-time event.

In a case where an online store and offline stores are run concurrently, it is difficult to practically analyze showrooming in which products are compared in an offline store and then purchase is performed at a lowest price in an online store and reverse showrooming in which products are compared in an online store and then purchase is performed at a lowest price in an offline store.

Furthermore, in order to construct and operate a customer relationship management (CRM) system for collecting and analyzing marketing data, a lot of money is necessary for extracting data from a legacy system, and for refining, data-warehousing (DW), and analyzing the extracted data. A use effect thereof is also uncertain.

The present disclosure dramatically improves a typical marketing scheme to present a method for allowing a user to easily know an ever-changing customer's reaction and field data.

SUMMARY

Embodiments provide an omni-channel marketing curation system based on big data capable of showing, in near real time, a vivid animation view in which a customer's reaction to a product and customer's activity are reflected through a big data platform, not in a typical expression scheme, to a company that concurrently runs an online store and offline stores.

Embodiments also provide an omni-channel marketing curation system based on big data capable of tracing a process of purchase decision of a customer who crosses online and offline stores to understand why the customer purchases that product at that store and predicting a customer's future behavior through searching and tracing a product associated with that product.

In addition, embodiments also provide an omni-channel marketing curation system based on big data capable of generating a virtual customer group that does not exist and simulating its reaction to a product.

Furthermore, embodiments also provide an omni-channel marketing curation system based on big data capable of newly configuring an integrated marketing strategy through determining contribution to online and offline sales results in an omni-channel view.

Finally, embodiments also provide an omni-channel marketing curation system based on big data capable of minimizing a construction cost with uses of open S/W and open H/W and utilizing a big data-based platform only with a simple operation by a user (or a marketer).

An embodiment of the present disclosure provides an omni-channel marketing curation system based on big data including: a data collecting unit configured to collect behavior log data of a customer in an online store and behavior log data of the customer who visits an offline store; a big data storing unit configured to process, in real time, the log data collected in the data collecting unit and apply a distributed storage module optimized for each data type and repetitive pattern to store bulk data in a high speed; a log verbalization converting unit configured to analyze the customer's online/offline behavior log data stored in the big data storing unit, convert the analyzed result into one of a plurality of predefined verbal expressions, which indicate degrees of customer's reactions to a product, to store the converted result in the big data storing unit; a first attribute setting unit configured to receive customer's attribute information from a system user so as to create a profile for a persona according to the attribute; a persona generating unit configured to group, into one persona, customers corresponding to the attribute information received by the first attribute setting unit, generate one or more pieces of visualization information in correspondence to verbal expressions, which indicate reaction degrees of the grouped persona to the product, and generate trajectory information through which how the visualization information moves to purchase the product; and a data visualization providing unit configured to consecutively play visualization information and trajectory information for each time period generated in the persona generating unit to provide, with animation, the reaction to the product and the trajectory of product purchase of the target persona.

In an embodiment, the omni-channel marketing curation system may further include an online store log collecting unit configured to recognize the customer who visits the online store, and collect a behavior history to the product of the customer who searches, checks, and pays for the product to transmit the collected result to the data collecting unit.

In an embodiment, the online store log collecting unit may determine through which of a PC or a mobile device the customer accesses the online store to transmit information capable of indicating an access device to the data collecting unit, and the data visualization providing unit displays what is the access device the target persona uses when the reaction to the product is provided with animation.

In an embodiment, the omni-channel marketing curation system may further include: an offline store log collecting unit configured to collect location and activity information of the customer who visits the offline store using a beacon sensor installed in the offline store to transmit the collected information to the data collecting unit.

In an embodiment, the data collecting unit may receive, from an offline store sale terminal, payment related information including a payment time, a payment amount, and purchased product details of the corresponding customer.

In an embodiment, the log verbalization converting unit may syntax-analyze and lexical-analyze the customer's behavior log data in the online and offline stores to convert the log data to one of the plurality of pre-defined verbal expressions according to a degree of customer loyalty.

In an embodiment, the persona generating unit may additionally generate visualization information in correspondence to verbal expressions that indicate reaction degrees to an associated product of the corresponding persona.

In an embodiment, the omni-channel marketing curation system may further including: a visualization rule storing unit configured to receive and store conditions, weights, and tracking ranges for generating the one or more pieces of visualization information, wherein the persona generating unit diversely generates the one or more pieces of visualization information according to the information stored in the visualization rule storing unit.

In an embodiment, the persona generating unit may include a motion script generating unit configured to diversely designate a motion type corresponding to a reaction degree to a product of a persona to be generated through the visualization information and trajectory information through which how the persona moves to purchase the product is knowable according to conditions input by a user.

In an embodiment, the motion script generating unit may include: a motion library connecting unit configured to specify the motion type and trajectory information of the persona; and a symbol designating unit configured to specify information on a size and color of the persona to be generated through visualization.

In an embodiment, the size and color of the persona to be generated through the visualization may be differed according to the motion type.

In an embodiment, the omni-channel marketing curation system may further include: a motion script storing unit configured to store script information generated in the motion script generating unit for each persona according to 5W1H, wherein the data visualization providing unit configures slides using the script information stored in the motion script storing unit for each persona according to 5W1H and combines colors to play with animation.

In an embodiment, the omni-channel marketing curation system may further include: a second attribute setting and displaying unit configured to set additional attribute information besides attribute information input from the first attribute setting unit and diversely display the corresponding persona's reaction degree to the product by using a change in color according to the set additional attribute information, wherein the persona generating unit re-creates a profile for the persona according to the additional attribute information set by the second attribute setting and displaying unit or refines the profile-created persona to generate the visualization information and trajectory information according thereto.

In an embodiment, the omni-channel marketing curation system may further include: a virtual persona simulation unit configured not to use the customer's behavior log data collected through the data collecting unit, but to generate a non-player character (NPC) for simulating a reaction of a virtual target persona, generate one or more pieces of visualization information in correspondence to verbal expressions indicating NPC's reaction degrees to the product, and generate trajectory information through which how the NPC moves to purchase the product is knowable, wherein the data visualization providing unit provides, with animation, the reaction to the product of the virtual target persona generated in the virtual persona simulation unit and the product purchase trajectory.

The details of one or more embodiments are set forth in the accompanying drawings and the description below. Other features will be apparent from the description and drawings, and from the claims.

DETAILED DESCRIPTION OF THE EMBODIMENTS

Advantages and features of the present disclosure, and methods for achieving the same will be cleared with reference to exemplary embodiments described later in detail together with the accompanying drawings.

The present disclosure may, however, be embodied in different forms and should not be construed as limited to the embodiments set forth herein.

The embodiments are just given to provide complete disclosure of the present disclosure and to provide thorough understanding of the present disclosure to those skilled in the art.

In addition, the present disclosure will only be defined by the appended claims.

Therefore, well-known constituent elements, operations and techniques are not described in detail in the embodiment (s), to prevent the present disclosure from being obscurely interpreted.

Like numbers refer to like elements having like functions and actions throughout the specification and drawings. The terms used (referred to) herein are for the purpose of describing the embodiment(s) only and are not intended to limit the invention.

As used herein, the singular forms are intended to include the plural forms as well, unless the context clearly indicates otherwise. The terms "comprises", "comprising", "includes" and/or "including", when used herein, specify the presence of stated components, operations and/or steps but do not precluded the presence or addition of one or more other components, operations, steps and/or groups thereof.

Unless otherwise defined, all terms (including technical and scientific terms) used herein have the same meaning as commonly understood by one of ordinary skill in the art to which the invention belongs.

It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be specifically described with reference to the accompanying drawings.

Figure 1:
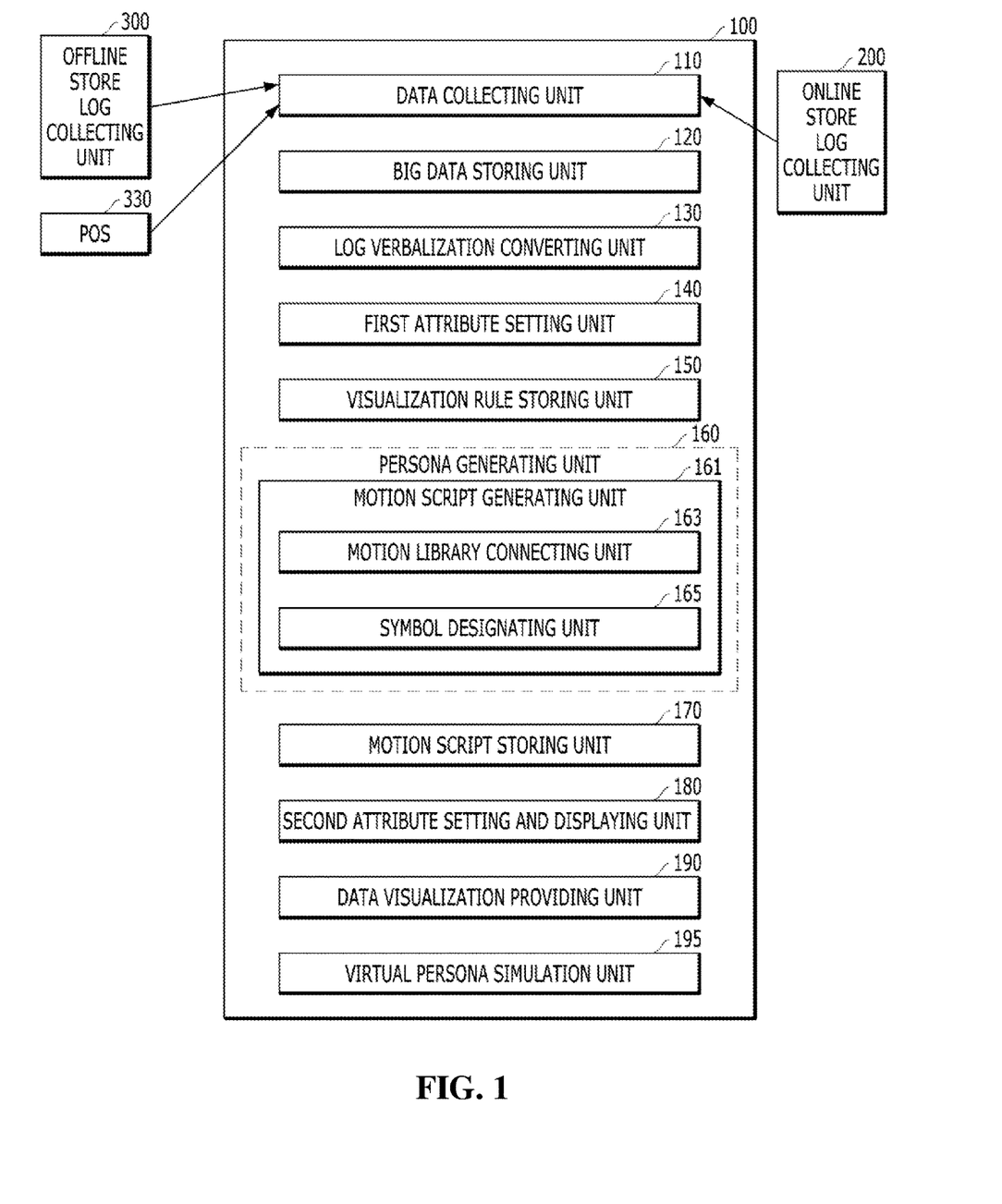
FIG. 1 is a block diagram of an omni-channel marketing curation system based on big data according to the present disclosure.
Figure 2:
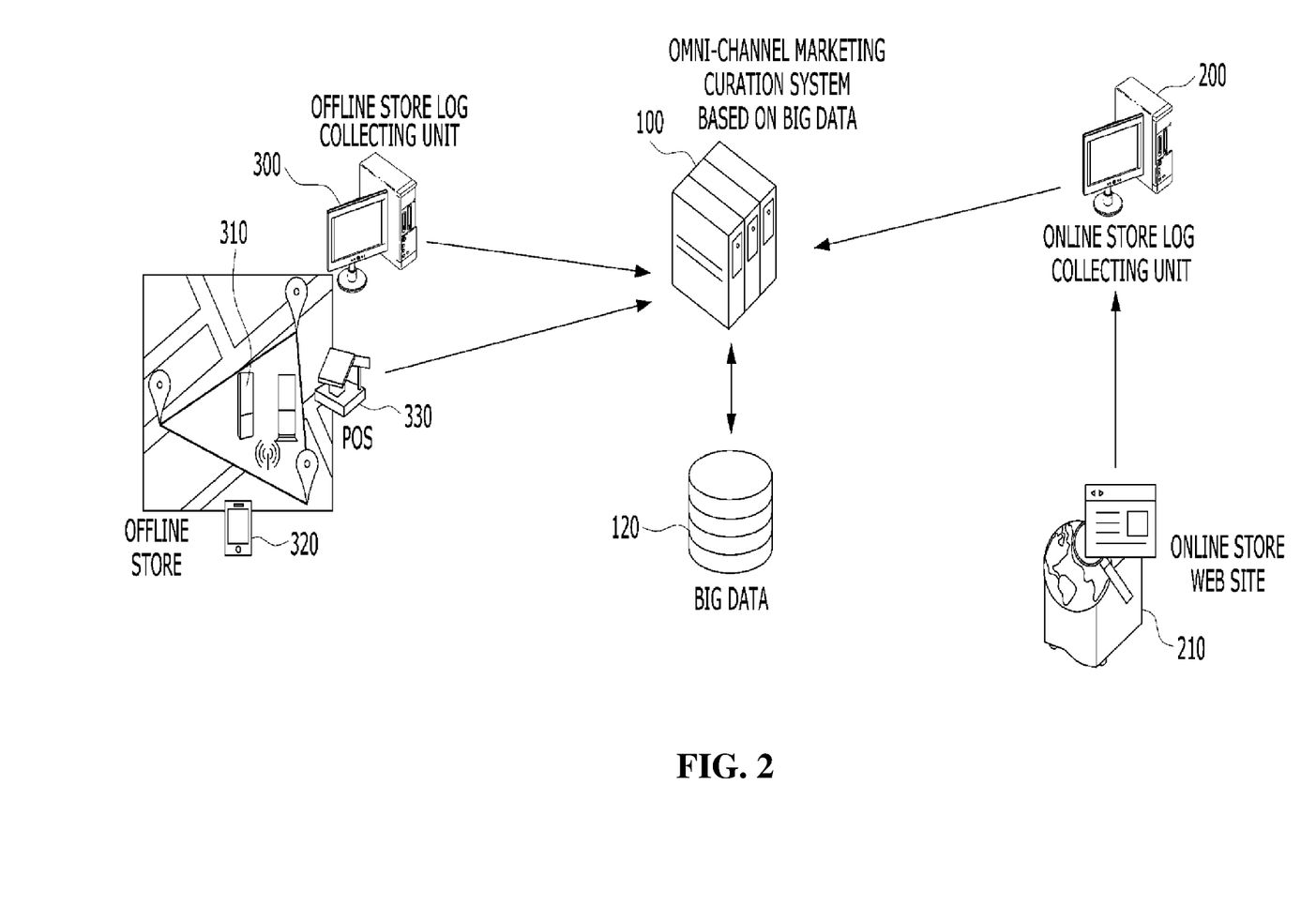
FIG. 2 is a configuration diagram illustrating a view that an omni-channel marketing curation system based on big data according to the present disclosure is connected to online and offline stores.

Referring to FIGS. 1 and 2, an omni-channel marketing curation system based on big data 100 according to the present disclosure includes a data collecting unit 110, a big data storing unit 120, a log verbalization converting unit 130, a first attribute setting unit 140, a persona generating unit 160, and a data visualization providing unit 190, and further includes a visualization rule storing unit 150, a motion script storing unit 170, a second attribute setting and displaying unit 180, a virtual persona simulation unit 195, an online store log collecting unit 200, and an offline store log collecting unit 300. The omni-channel marketing curation system based on big data 100 may target a company that concurrently runs online and offline stores. Hereinafter, a store is assumed to be A brand's store and a persona refers to a unit for summarizing and grouping customers (for example, customers visiting online and offline stores of A brand), and expressing a reaction and motion to a product of A brand.

The data collecting unit 110 collects behavior log data of a customer in an A brand's online store and behavior log data of the customer who visits an A brand's offline store.

Figure 3:
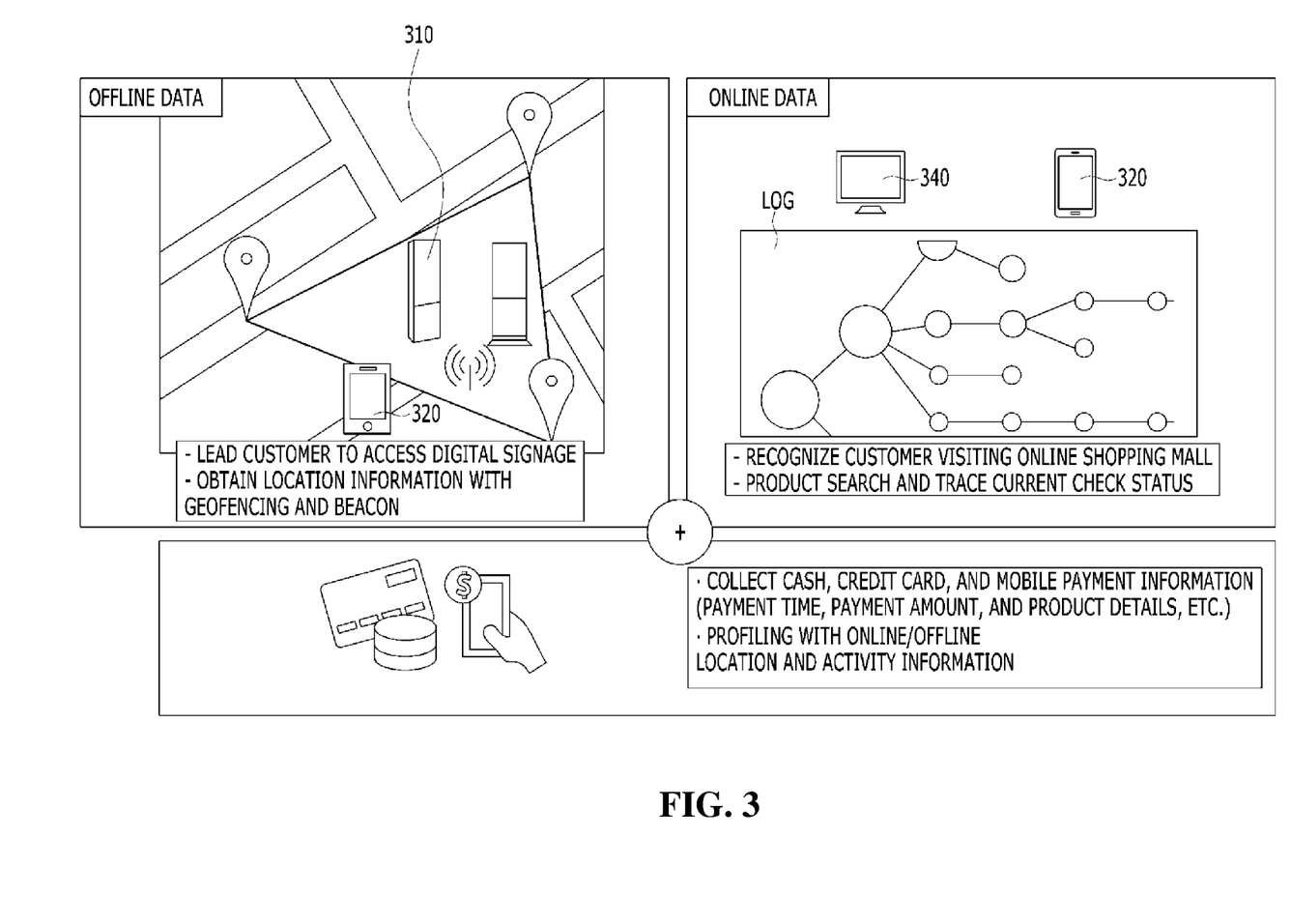
FIG. 3 is a conceptual diagram of customer's behavior log data of an online store and customer's behavior log data of an offline store.

Referring FIGS. 2 and 3, the online store log collecting unit 200 is connected to an A brand's online store site (server) to recognize a customer who visits the A brand's online store, collect a customer's behavior history of searching, checking and paying for an A brand's product, and transmit the collected behavior history to the data collecting unit 110. The customer, who visits the A brand's online store, inputs his/her name, age, gender, address, and other information to register as a member. Immediately after registration as the member, the customer may search and check products of A brand and may visit the A brand's online store again next time. At the time of next visit after registration as the member, the customer may also search a product in a logged-in state, or search, check, and pay for a product in an unlogged state. When a finger print technique is used, it is possible to collect log data of a customer who searches and checks products in the unlogged state. The finger print technique is well known to those skilled in the art and therefore a detailed description thereabout will be omitted.

The offline store log collecting unit 300 collects location and activity information of a customer, who visits an A brand's offline store, using a beacon sensor installed in the A brand's offline store, and transmits the collected location and activity information to the data collecting unit 110.

In detail, a digital signage 310 may be installed in the A brand's offline store for product promotion and a Raspberry Pi may be connected to the digital signage 310. The Raspberry Pi is a small computer and is well known to those skilled in the art. Therefore a detailed description thereabout will be omitted. Linux is installed in the Raspberry Pi and a beacon app is executed on Linux. When visiting the A brand's offline store, a customer accesses the digital signage with an interest in a product being promoted on the digital signage. Of course, the customer visiting the store has a mobile device 320 and an app capable of receiving a beacon signal is installed in the corresponding mobile device 320. The offline store log collecting unit 300 may be executed on Linux installed in the Raspberry Pi or on a separate terminal in the A brand's offline store. The offline store log collecting unit 300 collects customer's visit, location, and other activity information through a beacon signal reception app installed in the mobile device 320 of the customer, who visits the A brand's offline store, and transmits the collected information to the data collecting unit 110.

The data collecting unit 110 receives, from a sale terminal 330 in the A brand's offline store, payment-related information including a payment time, a payment amount, and purchased product details of the corresponding customer. The offline store's sale terminal 330 may use a point of sales (POS) system. When the customer visits the A brand's offline store to sense a beacon signal but does not purchase the product, the data collecting unit 110 does not receive payment-related information.

As described above, the data collecting unit 110 collects behavior log data of a customer who crosses online and offline stores.

The big data storing unit 120 processes in real time log data collected by the data collecting unit 110 and applies a distributed storage module optimized for a data type and a repetitive pattern to store bulk data in a high speed.

Figure 4:
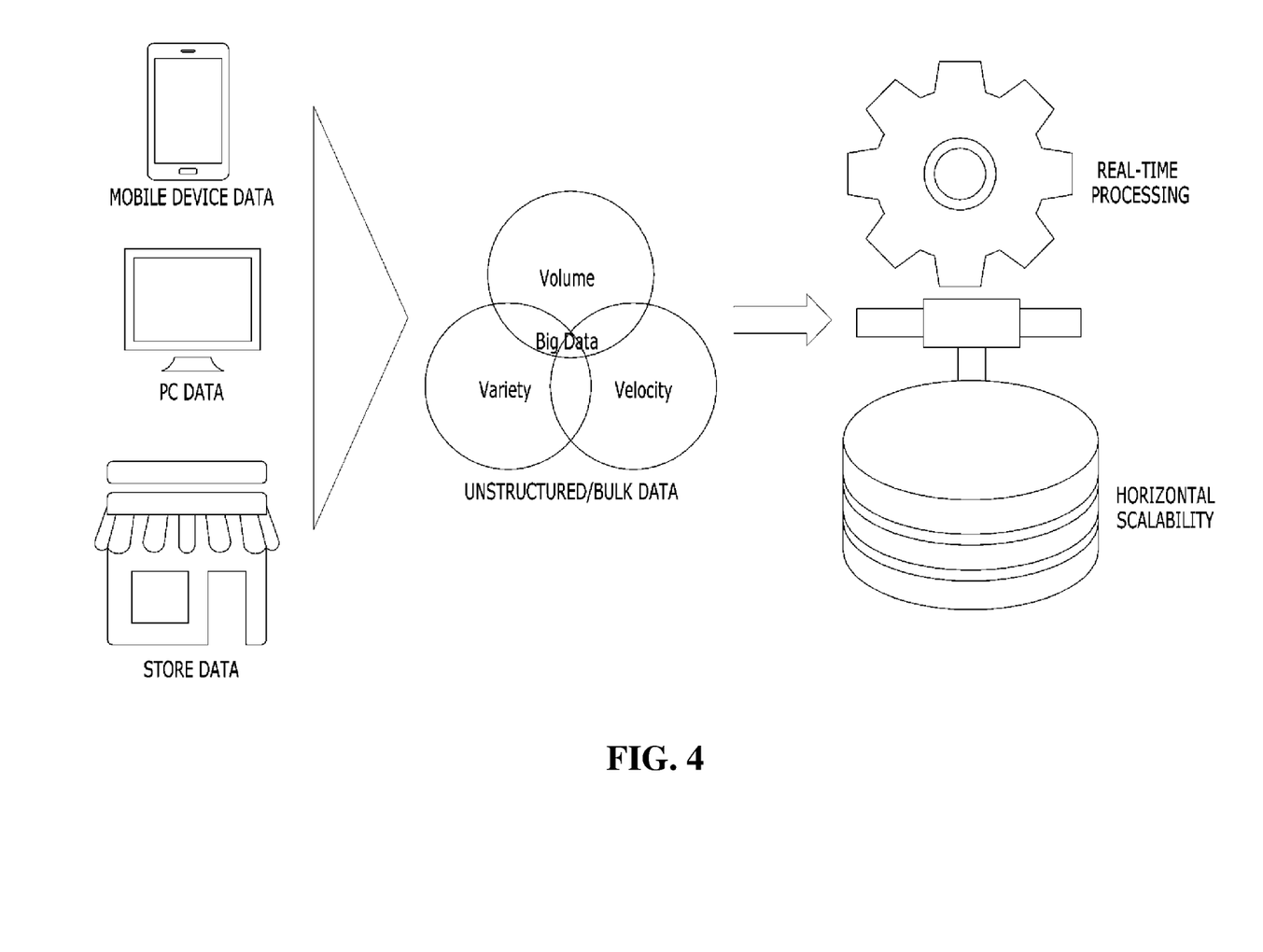
FIG. 4 is a conceptual diagram illustrating a view that unstructured/bulk data such as online behavior log data transmitted from a mobile device and a PC and offline store data transmitted from offline stores are processed in real time and stored in a big data system having horizontal scalability.

Referring to FIG. 4, the big data storing unit 120 stores, in a high speed, unstructured/bulk data including data collected online through a mobile device and a PC, and offline data, which is offline store data, in real time on the basis of a Hadoop system.

Figure 5:
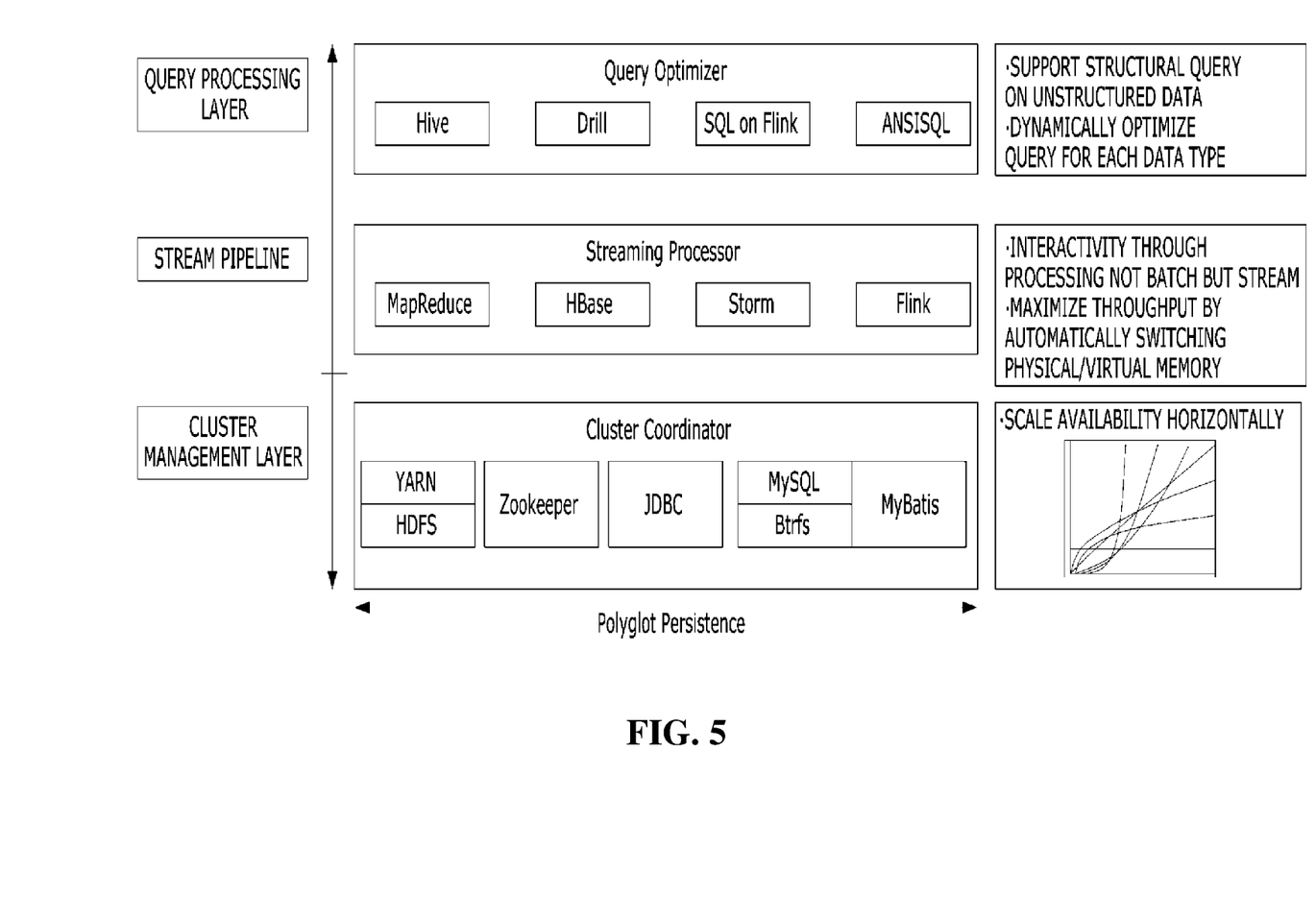
FIG. 5 illustrates a data storage architecture in which behavior log data of an online store customer and behavior log data of an offline store customer are stored.

Referring to FIG. 5, the big data storing unit 120 is configured of a query processing layer, a stream pipeline layer, and a cluster management layer, adopts (Polyglot Persistence) a distributed storage module optimized for a data type and a repetitive pattern, and is designed to be specialized in data in which an update does not occur around a write/read operation. In addition, availability thereof is horizontally scaled to maintain performance of O(log n).

The log verbalization converting unit 130 analyzes customer's online/offline behavior log data stored in the big data storing unit 120, converts the analyzed result into one of a plurality of pre-defined verbal expressions, which indicate degrees of customer's reactions to products, and stores the converted result in the big data storing unit 120.

Figure 6:
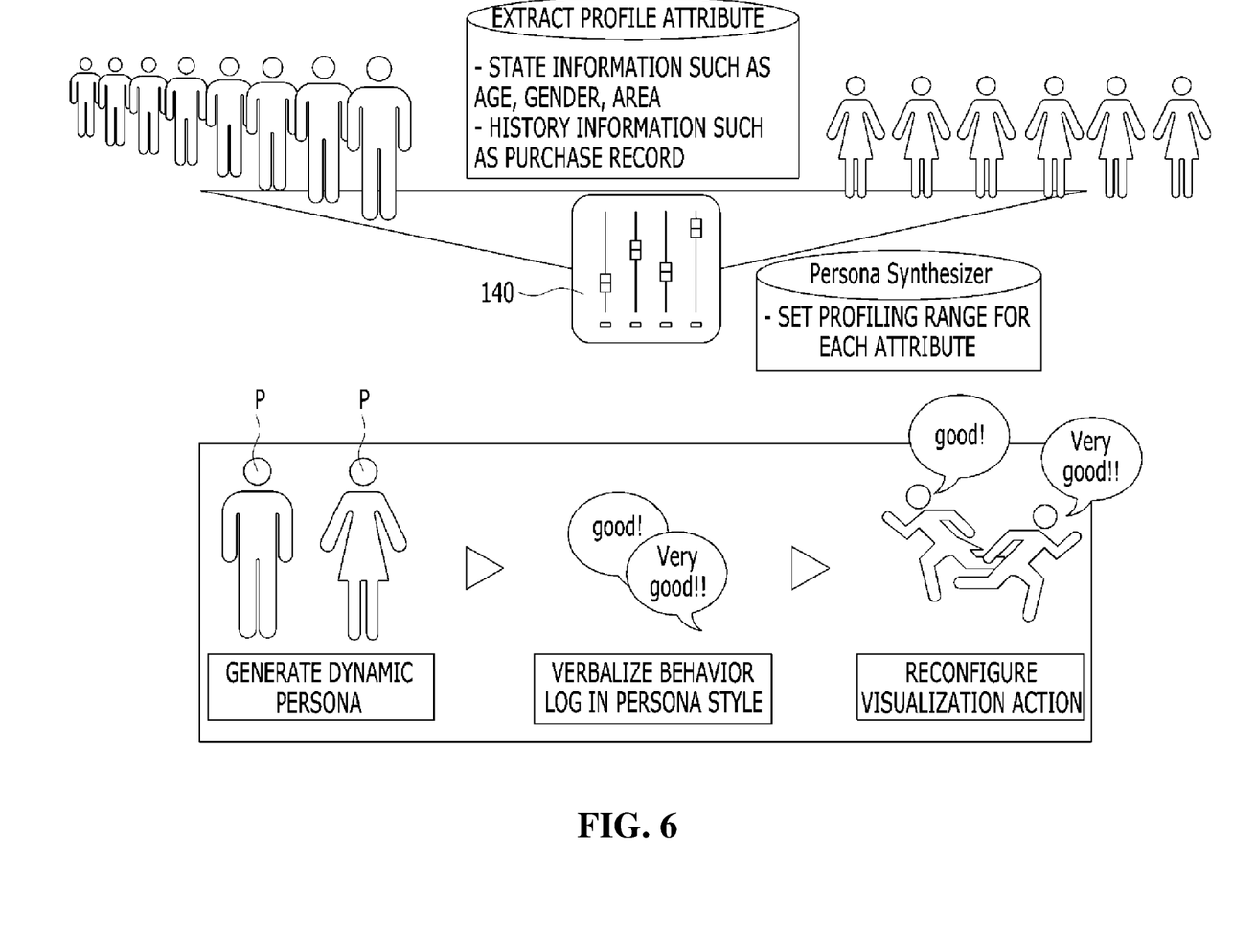
FIG. 6 is a conceptual diagram illustrating a view that collected log data of online and offline stores is stored and simultaneously analyzed in real time, a persona is dynamically generated according to attribute information set by a persona synthesizer, and a reaction of the corresponding persona to a product is reconfigured as a visualized action.
Figure 7:
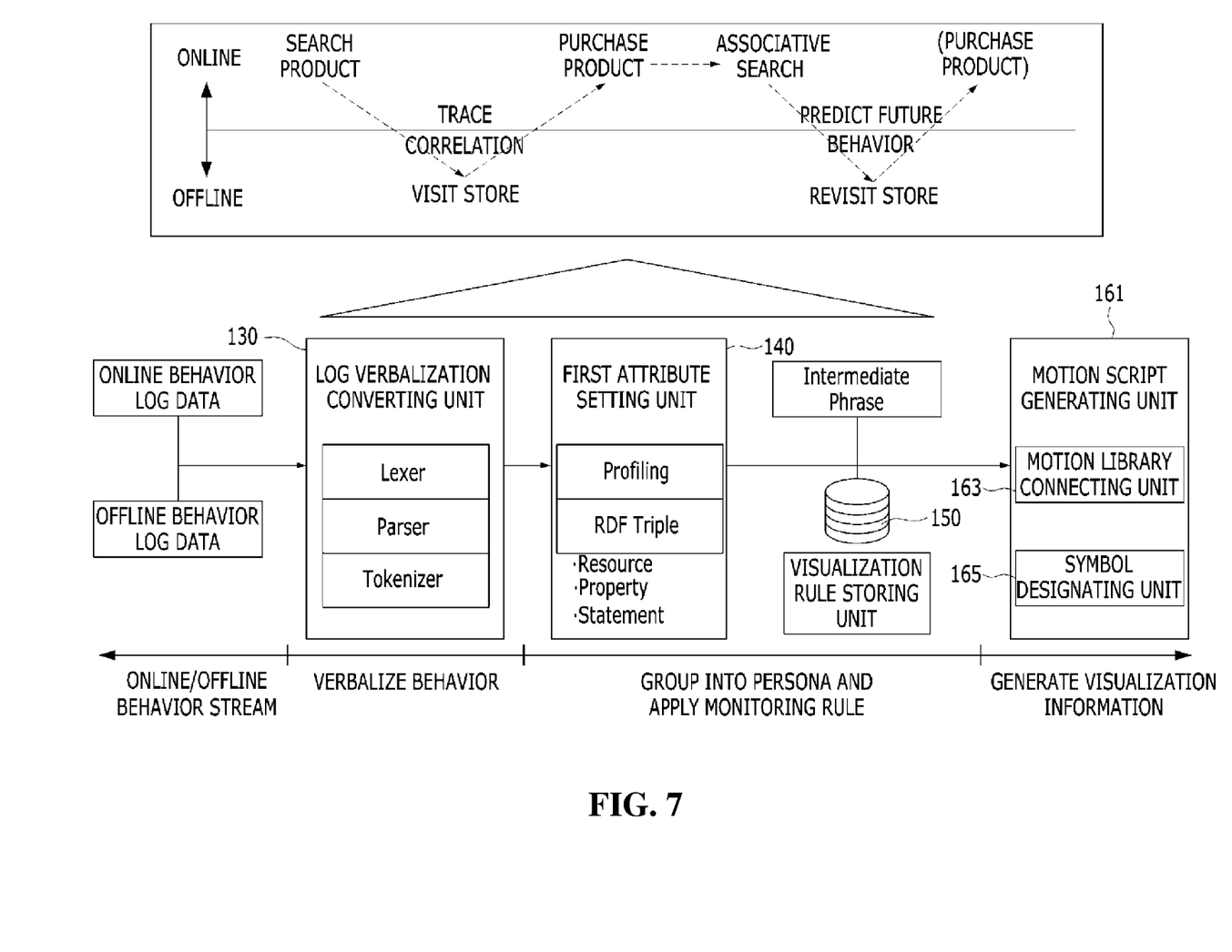
FIG. 7 is, as a view of structuralizing the conceptual diagram of FIG. 6, a persona generating architecture for analyzing to verbalize online/offline behavior log data and creating a profile for a persona to generate a persona's reaction to a product as visualization information.

Referring to FIGS. 6 and 7, the log verbalization converting unit 130 includes a tokenizer, a lexer, and a parser, syntax-analyzes and lexical-analyzes the customer's behavior log data in the A brand's online and offline stores to convert the log data to one of the plurality of pre-defined verbal expressions according to a degree of customer loyalty. For example, when a customer searches a product in an online store, visits an A brand's offline store, does not purchase the product in the offline store, purchases the corresponding product in the online store, and then searches a product associated with the corresponding product, loyalty of the customer is determined to be high according to an analysis result of log data and the log data thereof is converted to 'Very good!!', which is one of the plurality of pre-defined verbal expressions. When a customer searches a product in an A brand's online store and visits an A brand's offline store to purchase the product, the log data is also converted into 'Very good!!' or 'Good!!'. However, when a customer searches a product in an A brand's online store, visits an offline store, but does not purchase the product in both the online and offline stores, the log data may be converted into 'Bad'. Since such log data of a specific customer is accumulated and changed in various ways as time passes, when the customer does not make a purchase for a while after a product search or a store visit and then makes a purchase later, the log verbalization converting unit 130 may convert customer's behavior log data into 'Bad' initially and then into 'Good' later.

A result converted into one of the plurality of pre-defined verbal expressions by the log verbalization converting unit 130 is stored and managed in the big data storing unit 120 for each customer.

The first attribute setting unit 140 receives attribute information on a customer from a system user (or a marketer) in order to create a profile for a persona according to attributes. Referring to FIG. 6, the first attribute setting unit 140 is realized in a persona synthesizer type, which sets a profiling range for each attribute to provide convenience of operation to a user. The attribute information may correspond to information such as age, gender, area, or purchased product record. For example, a profile for a persona may be created by setting, as attributes, '30s', 'man', 'Suwon, Gyeonggi-do', and 'Autumn shirt'. In addition, it is also possible to designate associated attributes using a resource description framework (RDF) Triple. For example, 'autumn shirt' and 'belt' may be associated. The RDF triple is an ontology language used in a semantic web technique and well known to those skilled in the art. Therefore a detailed description thereabout will be omitted. As described above, the 'belt' is derived from creating a profile of 'autumn shirt' for A brand and an associative search.

Referring to FIG. 7, a correlation between behaviors of a corresponding persona in the A brand's online and offline stores may be traced through processes of the log verbalization converting unit 130 and the first attribute setting unit 140, and it is possible to predict a future behavior about whether to revisit the A brand's offline store through an associative search.

The persona generating unit 160 groups, into one persona, customers corresponding to the attribute information input from the first attribute setting unit 140, generate one or more pieces of visualization information in correspondence to verbal expressions, which indicate reaction degrees of the grouped persona to a product, and generates trajectory information through which how the visualization information moves to purchase the product may be known. Referring FIG. 6, the verbal expressions correspond to 'Good!!' and 'Very good!!', and as the visualization information corresponding to 'Good!!' and 'Very good!!', personas assume motions of running. When the verbal expression is 'Bad', a persona may assume a motion of sitting down or lying. When a persona assumes a motion, a speech bubble is additionally generated.

The persona generating unit 160 may additionally generate visualization information in correspondence to a verbal expression that indicates a reaction degree to the associated product of the corresponding persona. For example, when a motion of a persona shown in FIG. 6 is about the 'autumn shirt', how the corresponding persona reacts to the 'belt', which is an associative product, may be verbally expressed and visualization information corresponding to the verbal expression may be additionally generated.

The visualization rule storing unit 150 receives and stores conditions for generating one or more pieces of visualization information, weights, and tracking ranges. For example, restriction of locations of A brand's offline stores, a weight for each offline store, or a limit of the number of products to be shown as an associative search, etc., may correspond thereto.

The persona generating unit 160 diversely generates, according to a condition, one or more pieces of visualization information according to the information stored in the visualization rule storing unit 150.

In detail, the personal generating unit 160 includes a motion script generating unit 161 for diversely designating a motion type corresponding to a reaction degree to a product of a persona to be generated through the visualization information and trajectory information through which how the persona moves for purchasing the product may be known in various ways according to conditions input by a user.

Referring to FIG. 7, the motion script generating unit 161 includes a motion library connecting unit 163 for specifying a motion type of and trajectory information of a persona and a symbol designating unit 165 for specifying information on the size and color of the persona to be generated through visualization. The motion type refers to a sleeping state, a sitting down state, a jogging state, or a running state, etc., and the trajectory information refers to a state of performing online search, moving to an offline store, and then paying in an offline or online store.

The size and color of the persona to be generated through visualization may be differed according to the motion type. For example, when the corresponding persona assumes a motion of running, the size may be large and the color may be dark, and when the persona assumes a motion of sitting down, the size may be small and the color may be dull.

The motion script storing unit 170 stores, according to 5W1H, the script information generated for each persona in the motion script generating unit 161.

The data visualization providing unit 190 consecutively plays visualization information and trajectory information for each time period generated in the persona generating unit 160 to provide, with an animation, a reaction to a product and a product purchase trajectory of a target persona.

Figure 8:
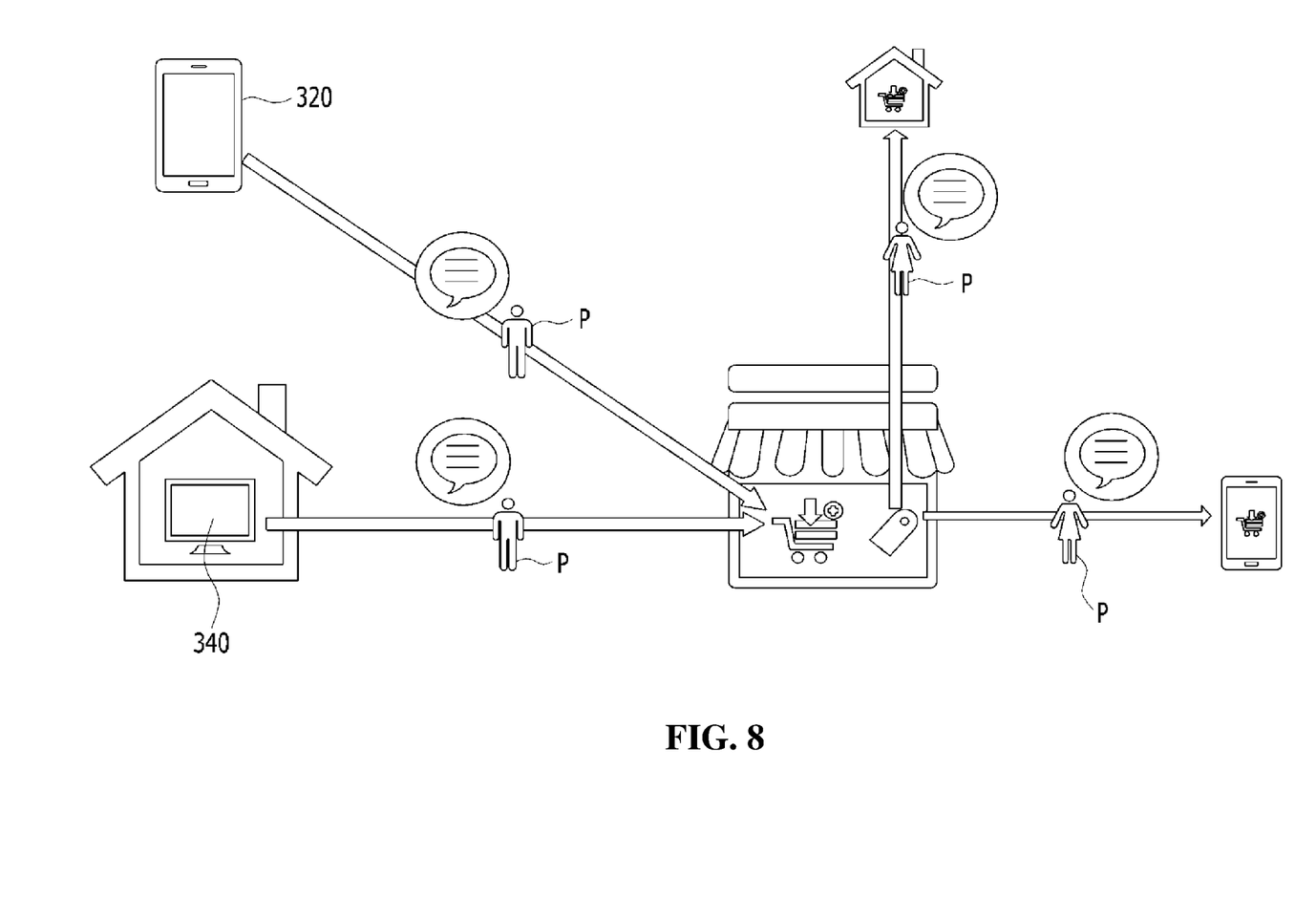
FIG. 8 is an exemplary view of animation for an analyzed result finally provided by a data visualization providing unit.

The online store log collecting unit 200 determines through which of a PC 340 or a mobile device 320 a customer accesses the A brand's online store, and transmits information capable of indicating the access device to the data collecting unit 110. The data visualization providing unit 190 displays which access device the target persona P uses, when providing the reaction to the product with animation. Since the PC 340 and the mobile device 320 have different types of operating systems (OSes) and OS information of a corresponding device is also transmitted at the time of accessing the online store, the online store log collecting unit 200 may transmit information indicating which access device is used to the data collecting unit 110. FIG. 8 illustrates a view that the data visualization providing unit 190 separately displays the mobile device 320 and the PC 340 according to the information about the access device transmitted to the data collecting unit 110.

Figure 9:
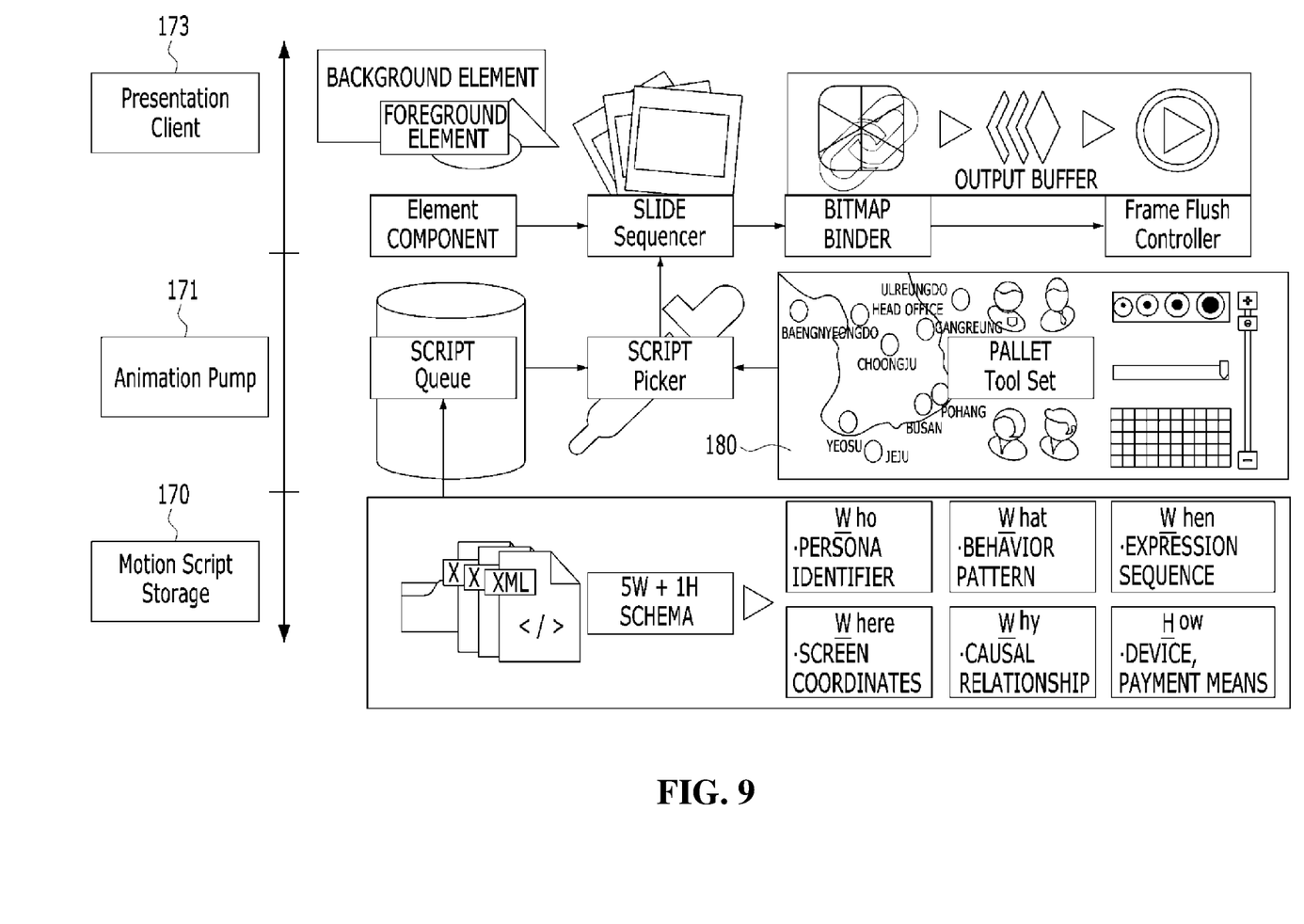
FIG. 9 is an architecture of the data visualization providing unit.

The data visualization providing unit 190 uses the script information according to 5W1H for each persona, which is stored in the motion script storing unit 170, to configure slides and combines colors to play with animation. FIG. 9 illustrates a structure in which slides are configured using script information according to 5W1H in which the corresponding persona (who) has a trajectory crossing the online and offline stores at what time (when), in which area (where), a product of interest is autumn shirt and belt (why), a motion is running state (what), and an access device is a mobile device (How), foreground elements and background elements are combined, the combined result is colored using a bitmap binder, and then the colored slides are played through an output buffer. FIG. 8 illustrates a video animation finally provided to a user by the data visualization providing unit 190. Through the animation, customer and field data varying in real time may be checked. In detail, the trajectory and reaction to the product of the corresponding persona, and what are the access device and a payment method may be checked. The user may intuitively understand a temporal/logical precedence relationship between events by representing the relationship with a dynamic motion.

The second attribute setting and displaying unit 180 may set additional attribute information besides the attribute information input from the first attribute setting unit 140 and display in various ways the corresponding persona's reaction degree to a product by using a change in color according to the set additional attribute information. The persona generating unit 160 recreates a profile for the persona according to the additional attribute information set in the second attribute setting and displaying unit 180 or refines the profile-created persona to generate visualization information and trajectory information according thereto.

Figure 10:
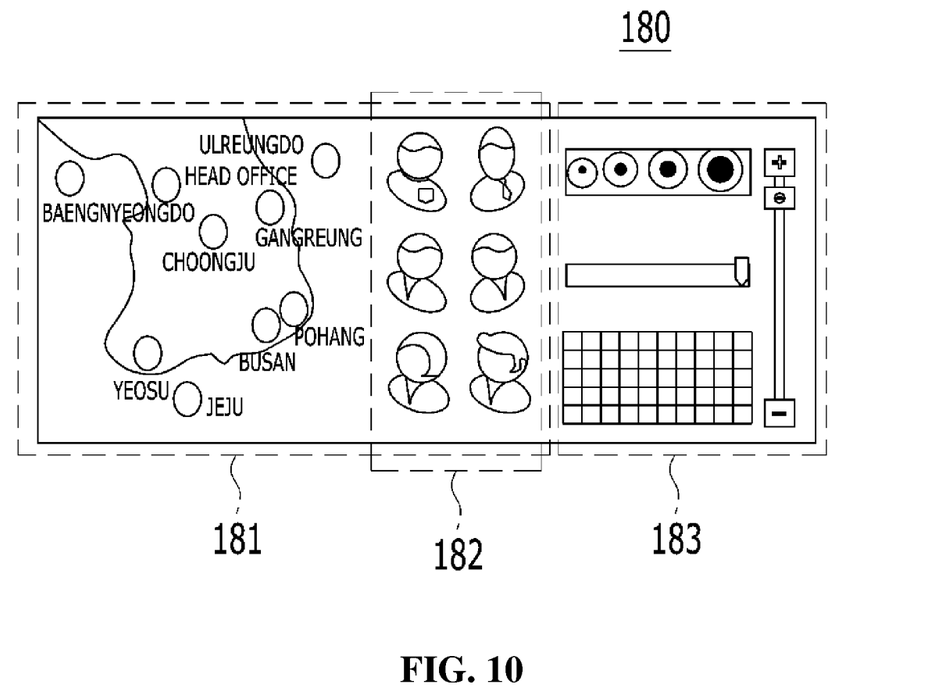
FIG. 10 is an exemplary view of a pallet for changing the attribute of a persona and displaying a reaction result according thereto.

Referring to FIGS. 9 and 10, the second attribute setting and displaying unit 180 is divided into a setting unit 181 and a displaying unit 183. The setting unit 181 may set an area and a character unit 182. When the first attribute setting unit 140 sets attributes as '30s of age', 'man', 'Suwon, Gyeonggi-do' and 'autumn shirt', 'a man sensitive to fashion' among characters of various features in the character unit 182 may be additionally set as attribute information. According to the additional setting, the persona becomes more refined and an animation in which the visualization information and trajectory information are reflected according thereto is provided. The displaying unit 183 displays the more refined persona's reaction degree to the product as changes in color, brightness, and chroma. Therefore there is an effect that the user may intuitively understand.

The virtual persona simulation unit 195 does not use the customer's behavior log data collected through the data collecting unit 110, but generates a non-player character (NPC) for simulating a reaction of a virtual target persona, generates one or more pieces of visualization information in correspondence to verbal expressions indicating NPC's reaction degrees to a product, and generates trajectory information capable of knowing how the NPC moves to purchase the product. The data visualization providing unit 190 provides, with animation, the virtual target persona's reaction to the product and the product purchase trajectory generated in the virtual persona simulation unit 195. Since the scheme in which the visualization information of the virtual target persona is generated and the visualization information is provided with animation is the same as the above-described mechanism for providing the target persona with animation, a detailed description thereabout will be omitted.

The NPC is to represent virtual customers that do not exist and to predict how the virtual customers react and move in the future, and is different from the above-described persona into which real customers who visit the A brand's online and offline stores are grouped.

A method for generating an NPC in order to simulate a reaction of the virtual target persona may be achieved by a system user (or a marketer) to operate a persona synthesizer to input attribute information through the first attribute setting unit 140 or copy the existing persona stored in the big data storing unit 120. In addition, the NPC (namely, the virtual persona) may be simulated by varying NPC generation conditions, weights, and tracking ranges to input them to the visualization rule storing unit 150 under a condition different from that of a persona existing in a real world.

For example, when there is an A brand's store in Suwon, Gyeonggi-do but not in Anyang, Gyeonggi-do, in order to simulate an A brand's marketing effect in the Anyang area, a marketer may input attribute information through the persona synthesizer or copy the existing persona in the Suwon area to generate the virtual target persona. Since Anyang has a less population than Suwon, weights of the stores may be different.

In this way, the marketing effect may be intuitively predicted by simulating how a virtual customer reacts and moves with respect to a product by means of a virtual persona simulation function.

According to an omni-channel marketing curation system based on big data, a customer's reaction occurring in an online or offline sales site may be easily known through an animation view.

In addition, what portion of a corresponding company moves customer's heart and steps may be known and a repurchasing probability may be predicted for each customer group.

In addition, a marketing effect on a virtual customer may be predicted by generating a virtual customer group that does not exist and simulating how the group reacts to the product.

In addition, an existence value of offline stores may be newly evaluated through an integration relationship of omni-channels, not through a competitive relationship of online and offline stores. In other words, a concern about cannibalization may be dispelled by quantitatively evaluating contribution for each affiliate in a company-wide sales result.

Furthermore, a platform may be provided through which small and medium franchise companies may utilize big data of a distribution network in practice at a minimized cost to accurately measure a marketing effect.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. An omni-channel marketing curation system based on big data comprising:
 a beacon sensor installed in an offline store;
 an offline store sale terminal installed in the offline store, wherein the offline store sale terminal is a point of sale (POS) system; and
 one or more processors configured to:
 collect online behavior log data of a customer in an online store and offline behavior log data of the customer who visits the offline store;
 recognize the customer who visits the online store, and collect a behavior history for a product of the customer who searches, checks, and pays for the product;
 collect, using the beacon sensor, location and activity information of the customer who visits the offline store, wherein the customer has a mobile device installed with a beacon signal reception application configured to communicate with the beacon sensor or the customer accesses a digital signage installed in the offline store and connected with a personal computer (PC) installed with a beacon signal reception application to communicate with the beacon sensor;
 receives, from the POS system, payment related information comprising a payment time, a payment amount, and purchased product details of the customer;
 process, in real time, the online and offline behavior log data and apply a distributed storage module optimized for each data type and repetitive pattern to store the online and offline behavior log data;
 analyze the online and offline behavior log data, convert an analyzed result into one of a plurality of pre-defined verbal expressions, which indicate degrees of the customer's reactions to the product, using a tokenizer, a lexer or a parser;
 receive the customer's attribute information from a system user so as to create a profile for a persona according to the attribute;
 group, into one persona, customers corresponding to the attribute information, generate one or more pieces of visualization information in correspondence to the verbal expressions, which indicate reaction degrees of the grouped persona to the product, and generate trajectory information through which how the visualization information moves to purchase the product; and
 consecutively play the visualization information and the trajectory information for each time period to provide, with animation, a reaction to the product and a trajectory of product purchase of a target persona,
 wherein the visualization information includes a size, a color or a motion image of the persona, the motion image representing a sleeping state, a sitting state, a jogging state or a running state of the persona, and
 wherein the one or more processors is further configured to:
 generate a non-player character (NPC) for simulating a reaction of a virtual target persona without using the customer's behavior log data, generate the visualization information in correspondence to the verbal expressions indicating NPC's reaction degrees to the product, and generate trajectory information through which how the NPC moves to purchase the product is knowable, and
 provide, with animation, the reaction to the product of the virtual target persona and the product purchase trajectory.

2. The omni-channel marketing curation system of claim 1, wherein the one or more processors determines through which of the PC or the mobile device the customer accesses the online store to collect information indicating an access device, and
 displays what is the access device the target persona uses when the reaction to the product is provided with animation.

3. The omni-channel marketing curation system of claim 1, wherein the one or more processors syntax-analyzes and lexical-analyzes the online and offline behavior log data to convert the log data to one of the plurality of pre-defined verbal expressions according to a degree of customer loyalty.

4. The omni-channel marketing curation system of claim 1, wherein the one or more processors additionally generates visualization information in correspondence to verbal expressions that indicate reaction degrees to an associated product of the corresponding persona.

5. The omni-channel marketing curation system of claim 1, wherein the one or more processors is further configured to:
 receive and store conditions, weights, and tracking ranges; and
 diversely generates the one or more pieces of visualization information according to the stored conditions, weights, and tracking ranges.

6. The omni-channel marketing curation system of claim 1, wherein the one or more processors is further configured to diversely designate the motion image corresponding to a reaction degree to the product of the persona to be generated through the visualization information and trajectory information through which how the persona moves to purchase the product is knowable according to conditions input by a user.

7. The omni-channel marketing curation system of claim 6, wherein the one or more processors is further configured to:
 specify the motion image and trajectory information of the persona; and
 specify information on the size and color of the persona to be generated through visualization.

8. The omni-channel marketing curation system of claim 7, wherein the size and color of the persona to be generated through the visualization is differed according to the motion image.

9. The omni-channel marketing curation system of claim 6, wherein the one or more processors is further configured to:
 store script information generated for each persona according to 5W1H, and
 create slides using the script information for each persona according to 5W1H and combines colors to play with animation.

10. The omni-channel marketing curation system of claim 1, wherein the one or more processors is further configured to:
 set additional attribute information and diversely display the corresponding persona's reaction degree to the product by using a change in color according to the set additional attribute information, and re-create a profile for the persona according to the set additional attribute information or refine the profile-created persona to generate the visualization information and trajectory information according thereto.

* * * * *